Dec. 15, 1970

E. TITTMANN

3,547,559

FLUID FLOW CONTROL SYSTEM

Filed Dec. 16, 1968

INVENTOR
Egon TITTMANN

By Michael S. Striker
his ATTORNEY

INVENTOR
Egon TITTMANN his ATTORNEY

United States Patent Office 3,547,559
Patented Dec. 15, 1970

3,547,559
FLUID FLOW CONTROL SYSTEM
Egon Tittmann, Leonberg, Germany, assignor to Robert Bosch, G.m.b.H., Stuttgart, Germany
Filed Dec. 16, 1968, Ser. No. 784,133
Claims priority, application Germany, Jan. 17, 1968, 1,675,496
Int. Cl. F04b *39/00, 49/00*
U.S. Cl. 417—279         16 Claims

ABSTRACT OF THE DISCLOSURE

A control valve which regulates the flow of fluid from an engine-driven variable-delivery pump to the cylinder of the steering booster in an automotive vehicle. The plunger of the control valve reciprocates in a cylinder which is provided with an inlet opening for reception of fluid from the pump, an outlet opening which admits fluid to the booster cylinder, and a bypass opening which can return fluid from the inlet opening directly to the suction side of the pump when the pump speed rises above that which corresponds to idling speed of the engine. The flow of fluid from the inlet opening to the outlet opening takes place through a passage provided in the plunger and including one or more metering orifices whose angular position with reference to the bypass can be changed to thus insure that the rate of fluid delivery to the booster cylinder in response to increasing pump speed can remain constant or rises or descreases, depending on the selected angular position of the metering orifice or orifices.

BACKGROUND OF THE INVENTION

The present invention relates to fluid flow control systems in general, and more particularly to improvements in fluid flow control systems which can be utilized to regulate the flow of liquid fluid to a steering booster or an analogous load from a source which delivers fluid at a variable flow rate, for example, from a variable-delivery pump which is driven by the engine of an automotive vehicle.

Pat. No. 2,835,201 to Pettibone discloses a fluid flow control system which is designed to furnish oil to the steering booster in an automotive vehicle. The system comprises a pump which is driven by the internal combustion engine and is designed to furnish to the load a desired amount of fluid when the engine is idling. When the engine operates at a higher speed, for example, at a top speed which is ten times the idling speed, the amount of fluid which reaches the load should not exceed the amount which is delivered to the load during idling. To insure such controlled delivery of fluid, the system of Pettibone comprises a bypass valve which returns fluid to the pump when the rate of delivery increases in response to a rise in engine speed above the idling speed. The arrangement is such that the rate of delivery to the load actually decreases when the engine operates at a speed above the idling speed. This is achieved by utilization of a baffle serving to divide the pressure chamber of the pump into two chambers which communicate with each other by way of a centrally located nozzle orifice in the baffle. The bypass valve receives fluid from a passage which in turn receives fluid from the nozzle orifice of the baffle. When the bypass valve opens and the rotational speed of the pump continues to rise, a pressure differential develops between the chambers at the opposite sides of the baffle whereby such differential causes axial displacement of the plunger in the bypass valve and the plunger regulates the delivery of fluid to the load in such a way that the rate of delivery decreases in response to increasing pump speed. A drawback of the just described control system is that it is satisfactory for use in automobiles but not in trucks wherein the booster should normally receive fluid at a rate which does not change at all or increases gradually in response to increasing pump speed, i.e., in response to increasing r.p.m. of the engine. Another drawback of the just described system is that the rate of delivery cannot be changed and that it comprises a large number of parts.

SUMMARY OF THE INVENTION

One object of my invention is to provide a fluid flow control system which constitutes an improvement over the just described conventional system and which enables the person in charge to select the rate at which the load receives fluid in response to increasing r.p.m. of the engine.

Another object of the invention is to provide a fluid flow control system which is simpler than the conventional systems and which is sufficiently versatile to warrant its utilization in all or nearly all types of automotive vehicles.

A further object of the invention is to provide a fluid flow control system which can deliver fluid at a constant rate, at a descreasing rate or at an increasing rate when the speed of the engine rises above idling speed.

The invention is embodied in a fluid flow control system which is particularly suited to deliver oil or other liquid fluid to a steering booster in an automotive vehicle or to an analogous load. The control system comprises a source of fluid including engine-driven pump means operable at different speeds to supply fluid at a variable rate, and a control valve which comprises a cylinder having an inlet opening for admission of fluid from the source, an outlet opening for admission of fluid to the load, and a bypass opening for returning fluid to the source, a valve member reciprocable in the cylinder and defining a passage connecting the inlet opening with the outlet opening, the passage including at least one metering orifice having an axis which is substantially normal to the axis of the valve member, at least that portion of the valve member which is provided with the orifice or orifices being adjustable angularly with reference to the cylinder (i.e., with reference to the bypass opening), and biasing means for urging the valve member to a position in which the valve member seals the bypass opening from the other two openings. The valve member is displaced against the opposition of the biasing means when the rate of fluid flow from the source increases beyond a predetermined value corresponding to a given speed of the engine, preferably when the rate of fluid flow increases because the engine speed rises beyond the idling speed.

The biasing means can perform the additional function of normally holding the valve member against angular displacement with reference to the cylinder; however, such function can be performed by a separate element, for example, by a pin or the like.

The novel features which are considered as characteristic of the invention are set forth in particular in the appended claims. The improved fluid flow control system itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
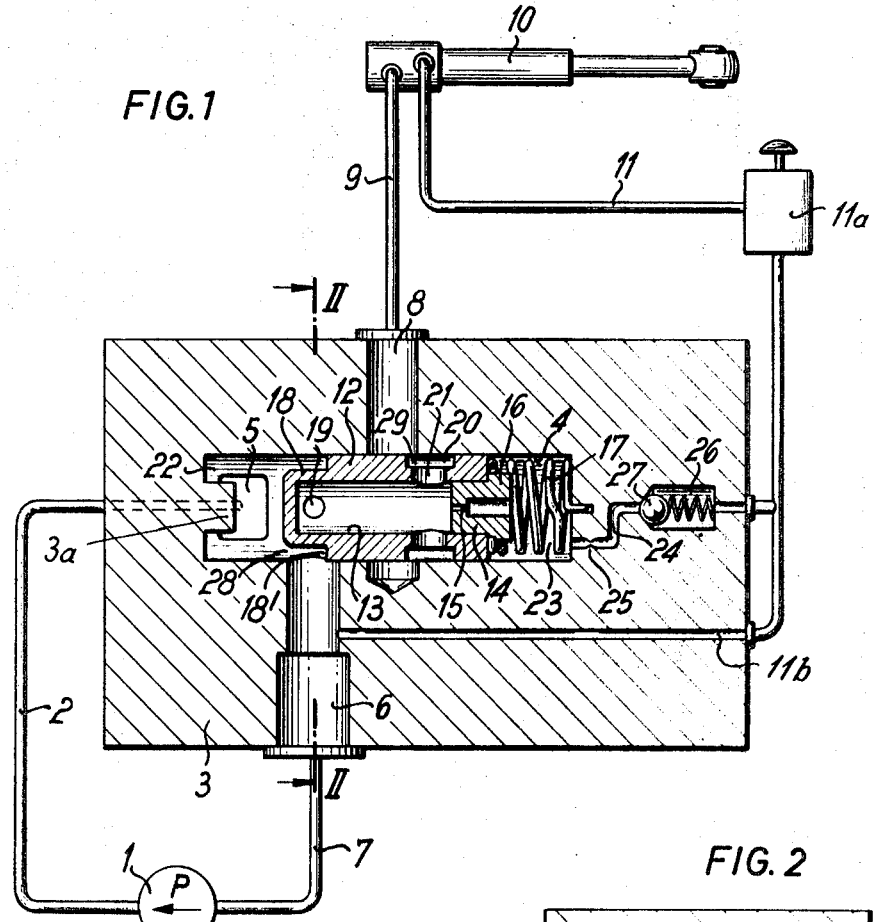
FIG. 1 is a diagrammatic view of a fluid flow control system which embodies one form of the invention, the control valve being shown in axial section.

Referring first to FIG. 1, there is shown a variable-delivery pump 1 which is driven by the internal combustion engine E of an automotive vehicle and constitutes a source arranged to supply fluid at a flow rate which varies in dependency on rotational speed of the engine E. The pump 1 supplies fluid to and receives fluid from a control valve which includes a housing or cylinder 3 having an inlet opening 5 connected to the pressure side of the pump by a supply conduit 2, an outlet 8 opening connected to a load 10 (for example, the cylinder of a steering booster) by a supply conduit 9, and a bypass opening 6 which is connected to the suction side of the pump by a return conduit 7. It is clear that the cylinder 3 can form an integral part of the housing in the pump 1. This cylinder has an elongated bore 4 whose axis is normal to the axis of and which communicates with the discharge end of the inlet opening 5. The point where the bore 4 communicates with the opening 5 is adjacent to one axial end of the bore. The axis of the bypass opening 6 makes an angle of 90 degrees and crosses in space with the axis of the inlet opening 5. Also, the point where the bore 4 communicates with the receiving end of the opening 6 is axially spaced from the discharge end of the opening 5 but only by a relatively short distance. The outlet opening 8 has a receiving end which communicates with a central portion of the bore 4 and is located diametrically opposite or at right angles to the receiving end of the bypass opening 6. Furthermore, and as shown in FIG. 1, the receiving end of the opening 8 is axially offset from the opening 5 and 6. A return conduit 11 connects the cylinder 10 with the bypass opening 6. This conduit accommodates a fluid reservoir 11a and a portion thereof forms a bore 11b in the body of the cylinder 3.

The bore 4 accommodates a reciprocable valve member or plunger 12 which is formed with an axially extending blind bore 13. The right-hand end of the bore 13 is sealed by a stopper or plug 14 which is formed with an axially extending constriction 15 communicating with the bore 13. The plug 14 is rigid with the plunger 12 and has an extension 16 which is fixedly connected with one end portion of a helical spring 17 constituting a means for biasing the plunger 12 in a direction to the left, as viewed in FIG. 1, and to a position in which the plunger seals the bypass opening 6 from the openings 5 and 8. The other end of the spring 17 is fixedly secured to the cylinder 3 at the right-hand end of the bore 4. The spring 17 performs the additional function of normally holding the plunger 12 against rotation with reference to the cylinder 3.

The left-hand end portion or tip 18 of the plunger 12 is of reduced external diameter and its cylindrical wall is formed with a radially extending metering orifice or metering passage means 19 which establishes a path for the flow of fluid between the inlet opening 5 and the blind bore 13. The annular clearance around the cylindrical external surface of the tip 18 is in permanent communication with the inlet opening 5 and can communicate with the bypass opening 6 if the plunger 12 is moved to the right against the opposition of the spring 17.

A median portion of the plunger 12 is formed with an external annular groove 20 which communicates with the blind bore 13 by way of two radial ports 21 machined into the plunger diametrically opposite each other. The plunger 12 divides the bore 4 into a left-hand chamber 22 which is in permanent communication with the inlet opening 5 and can also communicate with the opening 6 and/or 8, depending on the axial position of the plunger, and into a right-hand chamber 23 which accommodates the spring 17. A bore 24 connects the chamber 23 with the return conduit 11 and is provided with a construction 25 located upstream of a pressure relief valve 27 installed in a compartment 26 of the cylinder 3. The valve 27 is a simple ball check valve whose spherical element is biased against its heat by a helical spring in the compartment 26.

When the plunger 12 assumes the position which is shown in FIG. 1, its tip 18 and its annular shoulder 18' define a flow restricting or throttling channel 28 for the fluid which flows from the chamber 22 into the bypass opening 6. A second flow restricting or throttling channel 29 is then provided between the annular groove 20 and the receiving end of the outlet opening 8.

Figure 2:
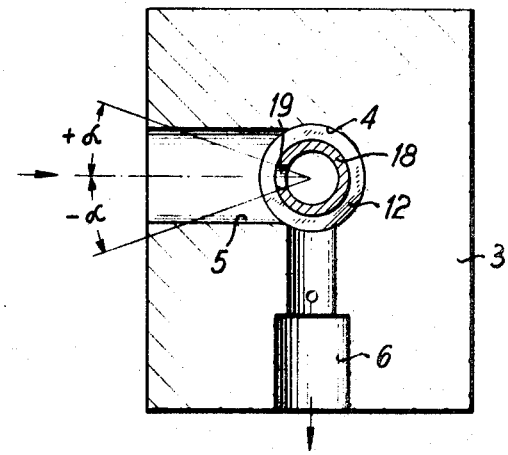
FIG. 2 is a transverse sectional view of the control valve as seen in the direction of arrows from the line II—II of FIG. 1.

FIG. 2 shows that the axis of the metering orifice 19 forms with the axis of the bypass opening 6 an angle of 90 degrees. In accordance with a feature of the present invention, the entire plunger 12, or at least that part of the plunger which defines the orifice 19, is movable angularly with reference to the cylinder 3 so as to change the angle between the axes of the orifice 19 and bypass opening 6, either in a positive or in a negative sense. This is indicated in FIG. 2 by the angles plus alpha and minus alpha. The angle alpha is the angle between the axes of the metering orifice 19 and the axis of the inlet opening 5. The orifice 19 forms part of a passage which further includes the blind bore 13, ports 21 and annular groove 20 and is provided in the plunger 12 to establish a path for the flow of fluid from the chamber 22 (i.e., from the iinlet opening 5) to the outlet opening 8 in nearly all axial positions of the plunger.

When the engine E is running and the pump 1 delivers fluid into the supply conduit 2, such fluid enters the chamber 22 by way of the inlet opening 5. It is assumed that the spring 17 is fully expanded so that the tip 18 of the plunger 12 bears against a stop 3a provided on the cylinder 3 and extending into the chamber 22. The fluid flows from the chamber 22 through the orifice 19, bore 13, ports 21, groove 20, outlet opening 8, supply conduit 9, cylinder 10, return conduit 11 and back to the suction side of the pump 1 by way of the bypass opening 6 which receives such fluid from the bore 11b. Some of the fluid flows from the bore 13 through the constriction 15 and into the right-hand chamber 23. The constriction 14 serves to damp axial movements of the plunger 12 and as a measuring means for fluid which can reach the relief valve 27.

If the flow rate of fluid delivered by the pump 1 reaches a predetermined value, the pressure differential at the opposite sides of the metering orifice 19 increases in a well known manner so that the plunger 12 begins to move to the right and causes the spring 17 to store energy. The shoulder 18' exposes a portion of the receiving end of the bypass opening 6 (channel 28) so that some of the fluid flows from the chamber 22, through the opening 6 and into the conduit 7 to return to the suction side of the pump 1.

Figure 3:
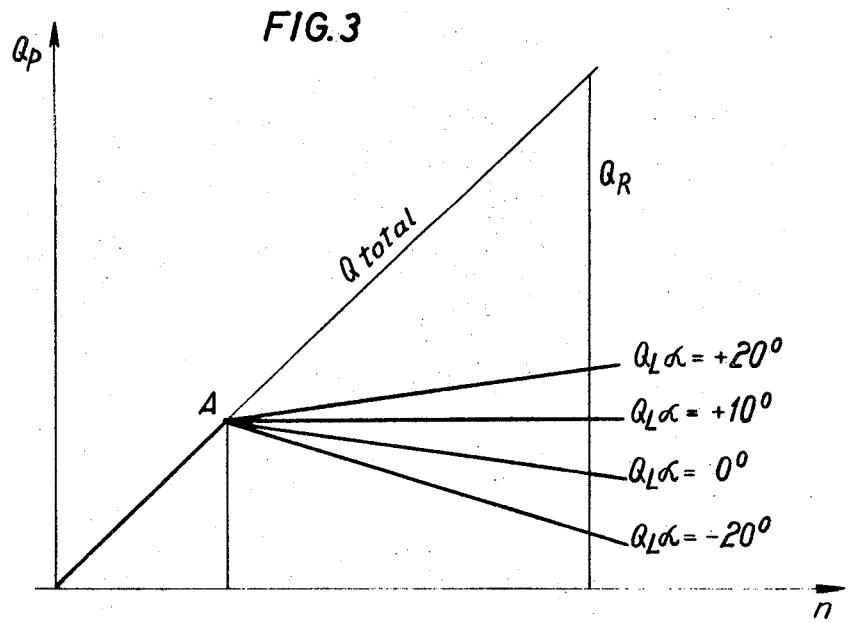
FIG. 3 is a graph showing the manner in which the amount of fluid which reaches the load varies in response to changes in angular position of the metering orifice with reference to the bypass opening in the valve of FIGS. 1 and 2.

In the diagram of FIG. 3, the rotational speed $n$ of the pump 1 (which is proportional to rotational speed of the engine E) is measured along the abscissa and the total output $Q_P$ of the pump is measured along the ordinate. $Q_L$ is the amount of fluid which leaves the cylinder 3 by way of the outlet opening 8, and $Q_R$ is the amount of fluid which is returned to the pump from the chamber 22 directly by way of the bypass opening 6. Direct outflow of fluid by way of the opening 6 begins at A, i.e., at a rotational speed of the pump 1 which corresponds substantially to idling speed of the engine E. As mentioned before the operation of the fluid flow control system is preferably such that the amount $Q_L$ decreases gradually or remains constant when the rotational speed of the pump 1 increases beyond A. This is achieved by proper positioning of the orifice 19 with reference to the bypass opening 6, i.e., by appropriate selection of the angle between the axes of the orifice 19 and the opening 6. When the angle alpha is zero (i.e., when the axis of the orifice 19 coincides with the axis of the inlet opening 5 and makes with the axis of the opening 6 an angle of 90 degrees), the amount $Q_L$ decreases gradually as the speed $n$ of the pump 1 increases beyond A. If the angle alpha is increased to plus 10 degrees, the amount $Q_L$ remains substantially constant while the speed of the engine E increases beyond the idling speed; the amount $Q_L$ increases gradually if the angle alpha is increased to plus 20 degrees; and such amount decreases rather steeply if the angle alpha is changed to minus 20 degrees. The angle alpha can be varied all the way between zero and 360 degrees, either in a positive or in a negative sense.

Figure 4:
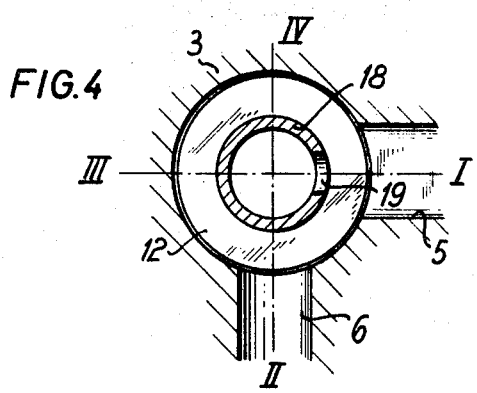
FIG. 4 is an enlarged view of a detail in the structure of FIG. 2.

Referring to FIG. 4, there is shown a portion of the structure of FIG. 2. If the angle alpha is varied within the first quadrant (between the lines I and II) while the pump speed $n$ rises beyond A, this corresponds to an angular displacement of zero to minus 90 degrees from the position of the axis of the orifices 19 as shown in FIG. 2. The amount $Q_L$ then decreases gradually at first and thereupon steeply when the angle approaches 90 degrees. In the quadrant between the lines II and III, the angle can vary between zero and plus 90 degrees whereby the amount $Q_L$ first decreases gradually and then rises steeply provided that the pump speed rises beyond A; in the quadrant between the lines III and IV (angular displacement of 90 to plus 180 degrees), the amount $Q_L$ first rises steeply and then decreases gradually if the speed $n$ rises above the value indicated at A; in the quadrant between the lines IV and I (angular displacement of 180 to 90 degrees), the amount $Q_L$ first shows a gradual rise and then a steep decline.

Figure 5:
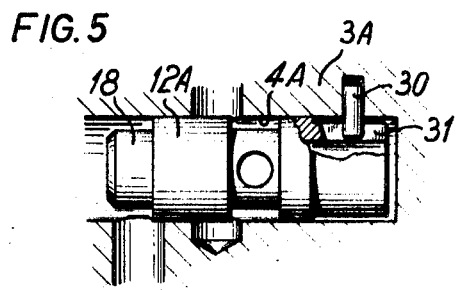
FIG. 5 is a fragmentary axial sectional view of a second control valve.

Of course, and as shown in FIG. 1, the angular position of the metering orifice 19 can be fixed and then remains unchanged if the plunger 12 is held against angular displacement by the spring 17. If desired, spring 17 may perform only the function of biasing the plunger 12 in a direction to reduce the volume of the chamber 22. The holding function of the spring 17 is then assumed by a different device which prevents angular displacement of the plunger, for example, by a pin 30 (FIG. 5) which extends into an axially parallel peripheral groove 31 of a slightly modified plunger 12A and holds the latter against rotation in the bore 4A of the cylinder 3A.

Figure 6:
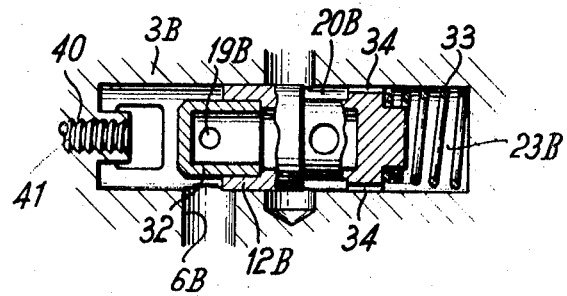
FIG. 6 is a fragmentary axial sectional view of a third control valve.

As shown in FIG. 6, the tip (indicated by the numeral 32) can form a separate part which is installed in a modified plunger 12B. Once the angular position of the axis of the orifice 19B in the tip 32 is selected with reference to the axis of the bypass opening 6B, the tip is glued to, forced into or otherwise non-rotatably secured to the plunger 12B to insure that the angular position of the orifice 19B remains unchanged unless a change in such angular position is desired. The means for holding the plunger 12B against rotation in the bore of the cylinder 3B comprises a helical spring 33 which is of conical shape and has one or more end convolutions in frictional engagement with the right-hand end portion of the plunger 12B. The constriction 15 of FIG. 1 is replaced by one or more axially parallel constrictions 34 here shown as grooves machined into the peripheral surface of the plunger 12B. The constrictions 34 connect the groove 20B with the right-hand chamber 23B.

Figure 7:
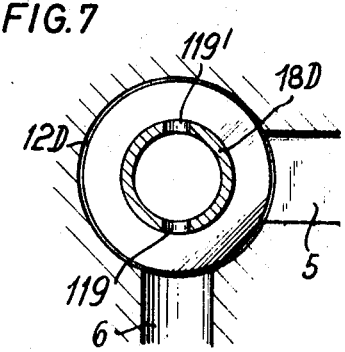
FIG. 7 is a fragmentary transverse sectional view of a fourth control valve.
Figure 8:
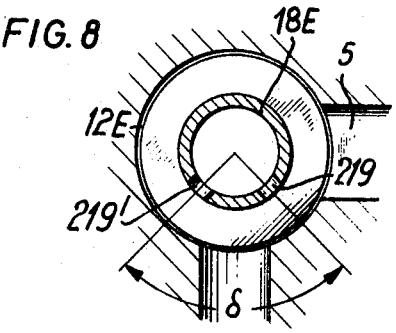
FIG. 8 is a similar transverse sectional view of a fifth control valve.

FIG. 7 shows that the tip 18D of a plunger 12D may be provided with several metering orifices 119, 119'. These orifices are located diametrically opposite each other. In FIG. 8, the axes of orifices 219, 219' in the tip 18E of the plunger 12E make an angle delta which is less than 180 degrees. An advantage of the structure shown in FIG. 7 or 8 is that the decreasing flow rate of fluid flow through one of the orifices 119, 119' or 219, 219' is compensated for by increasing flow rate through the other orifice to insure that the amount $Q_L$ remains constant (or that this amount varies at a desired rate) when the speed $n$ of the pump increases beyond the value indicated at A.

Referring again to FIG. 1, the relief valve 27 opens when the pressure of fluid in the cylinder 10 rises beyond a predetermined value, i.e., when the pressure in the chamber 23 rises sufficiently to force the fluid to pass through the constriction 25 and valve 27 into the return conduit 11. Pressure in the chamber 23 drops rapidly when the valve 27 opens and fluid in the chamber 22 rapidly moves the plunger 12 to its right-hand end position so that the cross-sectional area of the channel 28 increases sufficiently to insure that almost the entire amount of inflowing fluid returns to the pump from the chamber 22 by way of the bypass opening 6. The excess pressure of fluid is thus reduced within a very short period of time whereupon the spring 17 expands and moves the plunger 12 in a direction to reduce the area of the channel 28.

The meeting orifices (such as 19, 119 or 219) need not be in the form of unobstructed bores. For example, such orifices may accommodate disk-shaped throttles of negligible thickness which are practically insensitive to changes in viscosity of circulated fluid.

It is also possible to replace the tip 18 or 32 with a tip which is threaded into the plunger so that its angular position can be readily adjusted. For example, FIG. 6 shows that the cylinder 3B may be provided with a tapped bore 40 which extends through the stop for the tip 32 and accommodates a threaded plug 41 which can be moved to facilitate changes in angular position of the tip 32 (it being assumed that this tip threaded into the plunger 12B). Thus, the angular position of the tip can be changed without necessitating dismantling of the entire control valve.

An important advantage of my fluid flow control system is that the metering orifice or orifices are provided in the valve member of the control pump, i.e., in a part whose angular position can be changed, either in its entirety or in part, so that the axis of each metering orifice can make a desired angle with the axis of the bypass opening.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. In a fluid flow control system, particularly for delivering fluid to a steering booster or an analogous load, a combination comprising an engine-driven source of fluid operable at different speeds to supply a fluid at a variable flow rate; and a control valve comprising a cylinder having an inlet opening for admission of fluid from said source, an outlet opening for admission of fluid to the load, and a bypass opening for returning fluid to said source, a valve member reciprocable in said cylinder and defining a passage connecting said inlet opening with said outlet opening, said passage including metering passage means extending exclusively in a single plane transverse to the axis of the valve member and at least a portion of said valve member which defines said metering passage means being adjustable angularly with reference to said bypass opening, and biasing means urging said valve member to a position in which said valve member seals the bypass opening from the other openings, said valve member being displaced against the opposition of said biasing means when the rate of fluid flow from said source increases beyond a predetermined value corresponding to a given speed of the engine.

2. A fluid-flow control system as defined in claim 1, wherein said metering passage means comprises at least one metering orifice having an axis substantially normal to the axis of the receiving end of said bypass opening.

3. A fluid flow control system as defined in claim 1, wherein said source is arranged to deliver to said inlet orifice fluid at such a rate that said biasing means seals said bypass opening from the other openings within the lower speed range of the engine which is below said given speed.

4. A fluid flow control system as defined in claim 1, wherein said valve member is a plunger which comprises an end portion of reduced diameter having an annular wall which is provided with said metering passage means.

5. A fluid flow control system as defined in claim 4, wherein said plunger divides the interior of said cylinder into two chambers one of which accommodates said biasing means and the other of which accommodates said end portion and communicates with said inlet opening.

6. A fluid flow control system as defined in claim 1, wherein said valve member comprises a first portion and a second portion secured to said first portion and provided with said metering passage means.

7. A fluid flow control system as defined in claim 6, wherein said second portion is rigid with said first portion.

8. A fluid flow control system as defined in claim 6, wherein said second portion is angularly movable with reference to said first portion.

9. A fluid flow control system as defined in claim 1, wherein said biasing means is arranged to normally hold said valve member against angular movement with reference to said cylinder.

10. A fluid flow control system as defined in claim 9, wherein said biasing means comprises a helical spring having a first end portion affixed to said cylinder and a second end portion affixed to said valve member.

11. A fluid flow control system as defined in claim 1, wherein said valve member divides the interior of said cylinder into a first chamber which communicates with said inlet opening and said metering passage means and a second chamber, said valve member having at least one constriction establishing a path for the flow of fluid between said chambers.

12. A fluid flow control system as defined in claim 11, wherein said constriction connects said second chamber with said passage.

13. A fluid flow control system as defined in claim 1, wherein said metering passage means comprises a plurality of metering orifices.

14. A fluid flow control system as defined in claim 13, wherein said metering orifices include two orifices located diametrically opposite each other with reference to the axis of said valve member.

15. A fluid flow control system as defined in claim 13, wherein said metering orifices include two orifices having axes which make an angle of less than 180 degrees.

16. A fluid flow control system as defined in claim 1, further comprising means for normally holding said valve member against angular displacement in said cylinder.

References Cited
UNITED STATES PATENTS

| | | | |
|---|---|---|---|
| 2,835,201 | 5/1958 | Pettibone | 103—42 |
| 3,253,607 | 5/1966 | Drutchas | 137—117 |
| 3,367,269 | 2/1968 | Nelson et al. | 103—41X |
| 3,373,689 | 3/1968 | Brunson | 103—42 |
| 3,384,020 | 5/1968 | Searle | 103—41 |
| 3,385,220 | 5/1968 | Dymond | 103—41 |
| 3,415,194 | 12/1968 | Connelly | 103—41 |

MARK NEWMAN, Primary Examiner

W. J. KRAUSS, Assistant Examiner

U.S. Cl. X.R.

417—300